United States Patent

Headley

[11] 4,146,673
[45] Mar. 27, 1979

[54] PROCESS OF FILM RESISTOR LASER TRIMMING AND COMPOSITION OF REMOVABLE COATING USED THEREIN

[75] Inventor: Ronald C. Headley, Grand Island, N.Y.

[73] Assignee: E. I. Du Pont de Nemours and Company, Wilmington, Del.

[21] Appl. No.: 845,853

[22] Filed: Oct. 27, 1977

[51] Int. Cl.² .............................................. B32B 19/00
[52] U.S. Cl. ................................... 428/335; 252/500; 428/447; 427/53; 427/101; 260/375 B
[58] Field of Search ................ 427/53, 101, 102, 103; 156/250, 267, 268, 272; 428/334, 335, 447; 252/500; 346/76 L; 260/37 SB

[56] References Cited

U.S. PATENT DOCUMENTS

| 3,626,143 | 12/1971 | Fry | 346/76 L UX |
| 3,915,924 | 10/1975 | Wright | 260/37SB |
| 4,027,053 | 5/1977 | Lesk | 427/53 |
| 4,059,461 | 11/1977 | Fan et al. | 427/53 |

*Primary Examiner*—William J. Van Balen

[57] ABSTRACT

A process of film resistor laser trimming. The process involves coating a resistor prior to trimming with a removable insulative material which absorbs and traps trimming debris, thus minimizing or preventing deposition of same on the trimmed resistor surface. Formation of conductive paths otherwise created over the surface of the resistor by the trimming debris is precluded thereby, thus enabling greater accuracy with respect to trimmed resistor measurement. The coating used is a composition of phenyl polysiloxane with silica dispersed therein.

6 Claims, 2 Drawing Figures

PROCESS OF FILM RESISTOR LASER TRIMMING AND COMPOSITION OF REMOVABLE COATING USED THEREIN

BACKGROUND OF THE INVENTION

This invention concerns electrical resistors, and more particularly, film resistors which are amenable to high speed laser trimming as practiced in the microcircuits industry. The term laser trimming relates to the technique of adjusting the electrical resistance of a film resistor by laser removal of resistor material until desired resistance value is achieved. The removal is accomplished by thermal vaporization of the resistor material at the interface of a laser beam and the resistor surface. See, for example, the E. I. du Pont de Nemours & Co. publication No. A-99397 (7/74), "Laser Trimming Techniques For Thick Film Resistors".

During laser trimming, products of vaporization condense along the border of the laser-scribed path, forming an adherent residue. The effect of the residue on trimmed resistance measurement stability has generally not created a problem unless the resistance of the trimmed resistor exceeds $10^6$ ohms i.e., in the case of megohm resistors. As to the latter, the residue effectively forms an electrically conductive layer upon the resistor surface which interferes with reliable resistance measurement of the resistor during and after the laser trimming process. The result is the prevention of accurate and reliable adjustment of megohm resistors when using conventional laser trimming procedures.

SUMMARY OF THE INVENTION

This invention discloses a process of film resistor laser trimming wherein accurate and reliable adjustment of megohm film resistors may be achieved by using conventional laser trimming procedures. The process involves the application of a removable, electrically insulative coating material on the surface of a film resistor prior to laser trimming. The coating acts to retard the formation of an electrically conductive layer adherent to the film resistor surface during laser adjustment, produced by condensation of products of vaporization along the opened cut edge of the laser-scribed path. The coating is essentially transparent to laser energy, and acts as a sponge to trap the condensed products of vaporization (alternately called trimming debris). The coating is easily removed after laser trimming is completed, without adverse effect upon the laser trimmed resistance value.

Specifically, the process includes the steps of (1) coating a film resistor with an insulative composition of phenyl polysiloxane with silica powder dispersed therein, (2) trimming the resistor by laser until a desired resistance value is attained, and, optionally, (3) removing the coating material from the trimmed film resistor.

Also disclosed and claimed in the invention are the chemical combination of the coating used in the process, and, as an article of manufacture, the intermediate product of the coated film resistor.

DETAILED DESCRIPTION OF THE INVENTION

The invention involves the trimming of film resistors by laser energy. It also involves obtaining reproducible accuracy with respect to measurement of the resistance values of such resistors both during and after laser trimming. The film resistors are adherent to a dielectric substrate, and are produced by printing the resistor compositions (inorganic powders dispersed in a vehicle) on a substrate, usually followed by firing to sinter the powders into discrete, electrically continuous patterns on the substrate. Typical resistor compositions are based on pyrochlores (Bouchard U.S. Pat. No. 3,681,262) or ruthenium oxide (Faber et al. U.S. Pat. No. 3,304,199).

Prior to trimming, a film resistor having a resistivity greater than $10^6$ ohms is coated with a removable, electrically insulative coating consisting essentially of a silicone fluid in the form of phenyl polysiloxane having finely divided silica powder dispersed therein. The coating is preferably applied over the resistor surface at a thickness of approximately 1.5 to 2.5 mils (about 35–65 microns).

The phenyl polysiloxane used in the experiments reported below is Dow Corning 550 Fluid, having a viscosity of 100–150 Centistokes at 25° C., and existing in the liquid state at one atmosphere pressure in the temperature range of −40° to 230° C. The silica powder comprises 5–10% by weight of the total coating mixture, and preferably has an approximate surface area of 175–225 $m^2$/gm., more preferably 200 $m^2$/gm.

Although silicone fluid used alone theoretically possesses the properties required to carry out this invention, the low viscosity of the fluid allows spreading onto the conductive metallization pads attached to the resistor. This interferes with surface contact between the pads and the pressure actuated probes of the resistance measuring circuit. The silica powder serves as a viscosifying agent to inhibit spreading, and thus the interference problem is avoided.

Figure 1:
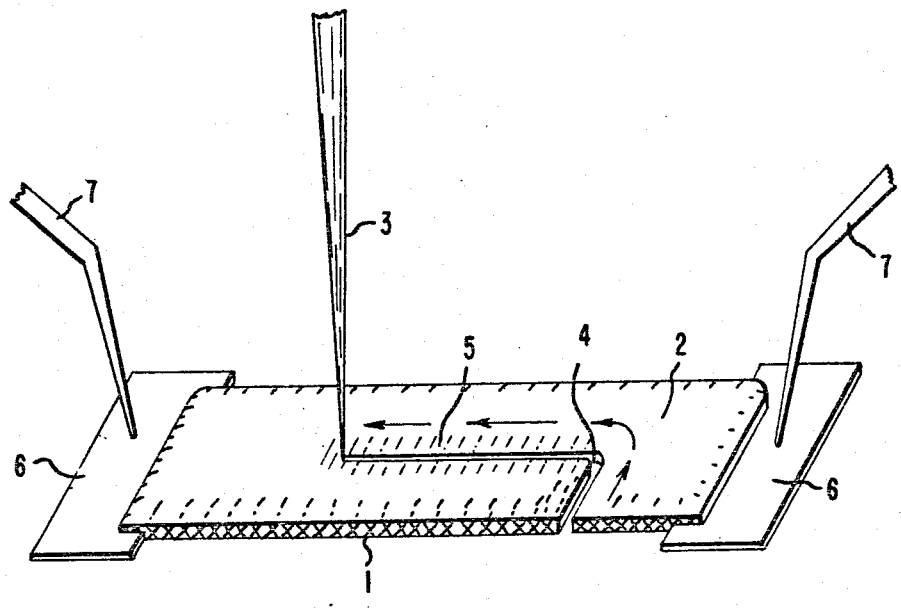
FIG. 1 is a pictorial view of a film resistor coated with the composition of this invention.

FIG. 1 is an illustration of an embodiment of the invention and shows a planar thick film resistor 1 which is supported by and fused to a ceramic substrate along with low resistance connective pads of metallization 6. The resistor bears a surface coating as described in the invention which has been deposited by conventional screen printing techniques although the invention does not exclude other means of deposition.

Laser trimming is accomplished by moving a high intensity focused laser beam 3 over the resistor surface in a controlled path as indicated by arrows. The laser beam is operated with sufficient intensity as to remove resistor material by vaporization to a depth desirably exceeding the resistor thickness. The coating does not significantly interfere with the laser induced removal of resistor material. The coating does, however, absorb the removed material in the shaded region 5 which borders the opened cut 4 formed by the laser beam. By absorbing most of the removed resistor material and holding it in suspension, the coating minimizes deposition of the removed material upon the resistor surface. In this manner formation of electrically conductive paths upon the resistor surface is largely inhibited and reliable resistance measurement of the resistor is made possible through probe contacts 7.

Figure 2:
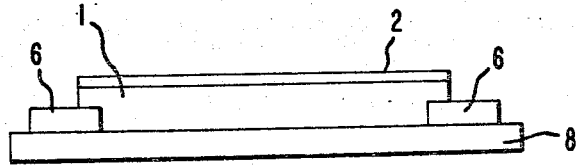
FIG. 2 is an elevation view of a film resistor coated with the composition of this invention, wherein the resistor is shown supported by a dielectric substrate.

FIG. 2 shows the coated film resistor mounted on a dielectric substrate 8.

EXAMPLE AND COMPARATIVE SHOWING

The following data are presented to illustrate this invention. In the example, comparative showing, and elsewhere in the specification and claims, all parts, percentages, ratios, etc. are by weight.

As an example of this invention a set of 10 fired thick film resistors 6 mm long by 0.5 mm wide and having a nominal sheet resistance of $10^7$ ohms per square (at approximately 1 mil thickness) on 96% $Al_2O_3$ ceramic substrates were coated with a mixture of Dow Corning 550 silicone fluid with 5.2% by weight finely divided silica (200 m$^2$/gm.) dispersed therein by means of screen printing through a 200 mesh screen (U.S. Standard sieve scale) to selectively coat resistor surfaces only. The coating thickness was nominally 50 micrometers (2 mils).

In a comparative showing, an identical set of 10 fired thick film resistors was left uncoated. Both coated and uncoated sets were then trimmed under identical conditions. A YAG-ESI model 25 laser trimmer was used with the following parameters: speed of 2 mm/sec.; pulse frequency of 1 kHz; lamp current of 14 amps.; and average beam power of about 0.15 watts. The 10 coated resistors and the 10 uncoated resistors were laser trimmed by means of a rectangular L cut as shown in FIG. 1 to resistance values of 20 to 40 percent greater than their unadjusted values. The trimmed resistors were measured using the laser system measurement bridge. Following measurement, all resistors were cleaned in an ultrasonic isopropylalcohol bath for approximately 1 minute, allowed to dry at room temperature for approximately 10 minutes, and then remeasured as previously described. The data depicting the percent resistance change upon cleaning have been compiled in Table 1.

The resistance change upon cleaning exhibited by the coated resistors is generally smaller than for the non-coated resistors. The differences in the measured resistance upon cleaning of the coated versus non-coated resistors is interpreted as being primarily a result of removing the electrically conductive laser formed resistor debris. Visual inspection under magnification immediately prior to cleaning of a coated sample showed a suspension of laser formed debris within the coating. Similar inspection of a non-coated sample showed laser formed debris adhering o the resistor surface. After cleaning, the coated sample was free of laser debris; the non-coated sample was not.

TABLE 1
LASER TRIMMED RESISTANCE DATA

| Resistor No. | Resistance in megohms | | % R |
|---|---|---|---|
| | Before Cleaning | After Cleaning | |
| Coated Resistors (Silicone Fluid/5.2% Silica) | | | |
| R1 | 211 | 218 | 3.3 |
| R2 | 234 | 242 | 3.4 |
| R3 | 276 | 271 | −1.8 |
| R4 | 303 | 298 | −1.6 |
| R5 | 201 | 202 | 0.5 |
| R6 | 297 | 299 | 0.7 |
| R7 | 236 | 236 | 0 |
| R8 | 296 | 297 | 0.3 |
| R9 | 206 | 207 | 0.5 |
| R10 | 226 | 227 | 0.4 |
| Non-Coated Resistors | | | |
| R1 | 245 | 267 | 9.0 |
| R2 | 260 | 285 | 9.6 |
| R3 | 248 | 258 | 4.0 |
| R4 | 250 | 265 | 6.0 |
| R5 | 207 | 207 | 0 |
| R6 | 217 | 234 | 7.8 |
| R7 | 239 | 268 | 12.1 |
| R8 | 249 | 294 | 18.0 |
| R9 | 231 | 247 | 6.9 |
| R10 | 229 | 249 | 8.7 |

Having thus described the invention, what is claimed is:

1. A method of laser trimming a film resistor, comprising in sequence:
    (a) coating said resistor with an insulative coating composition consisting essentially of phenyl polysiloxane fluid with finely divided silica dispersed therein, and
    (b) trimming said resistor by laser energy.

2. A method of laser trimming a film resistor, comprising in sequence:
    (a) coating said resistor with a removable, electrically insulative composition consisting essentially of 5–10 weight percent finely divided silica dispersed in phenyl polysiloxane fluid,
    (b) adjusting resistance of said resistor by laser removal of resistor material, and
    (c) removing said coating material from the adjusted resistor surface.

3. The method of claim 2 wherein said removing of coating composition from the trimmed resistor surface is by washing in isopropyl alcohol.

4. A film resistor coated with a composition consisting essentially of finely divided silica dispersed in phenyl polysiloxane fluid.

5. The coated film resistor of claim 4 wherein said silica is 5–10 weight percent of said coating.

6. The film resistor of claim 5 wherein the coatings is 1.5 to 2.5 mils thick.

* * * * *